Sept. 13, 1966   R. C. PETERSON ET AL   3,273,057
APPARATUS FOR CONTINUOUS VOLTAGE APPLICATION IN TESTING
Filed Dec. 31, 1963                     2 Sheets-Sheet 1

INVENTORS
Richard C. Peterson
John M. Seacord

BY Connolly and Hutz
ATTORNEYS

Sept. 13, 1966   R. C. PETERSON ET AL   3,273,057
APPARATUS FOR CONTINUOUS VOLTAGE APPLICATION IN TESTING
Filed Dec. 31, 1963   2 Sheets-Sheet 2
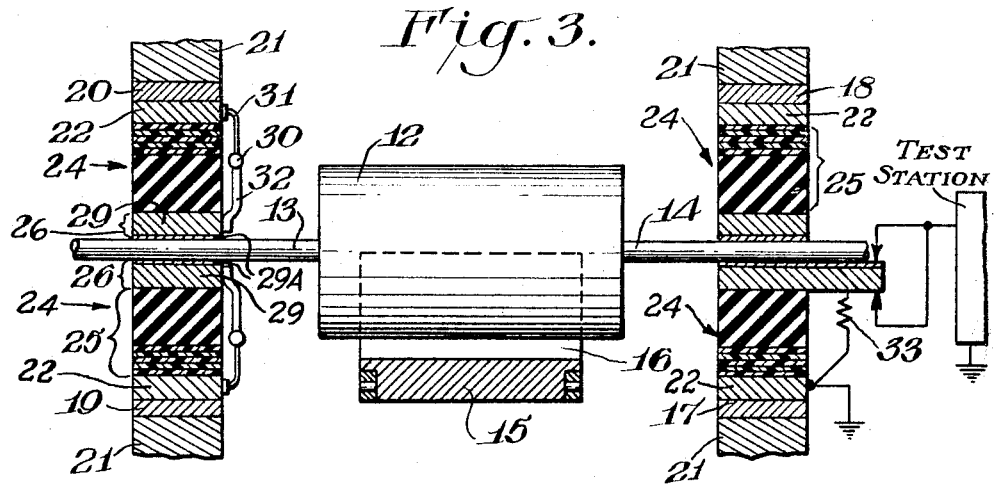
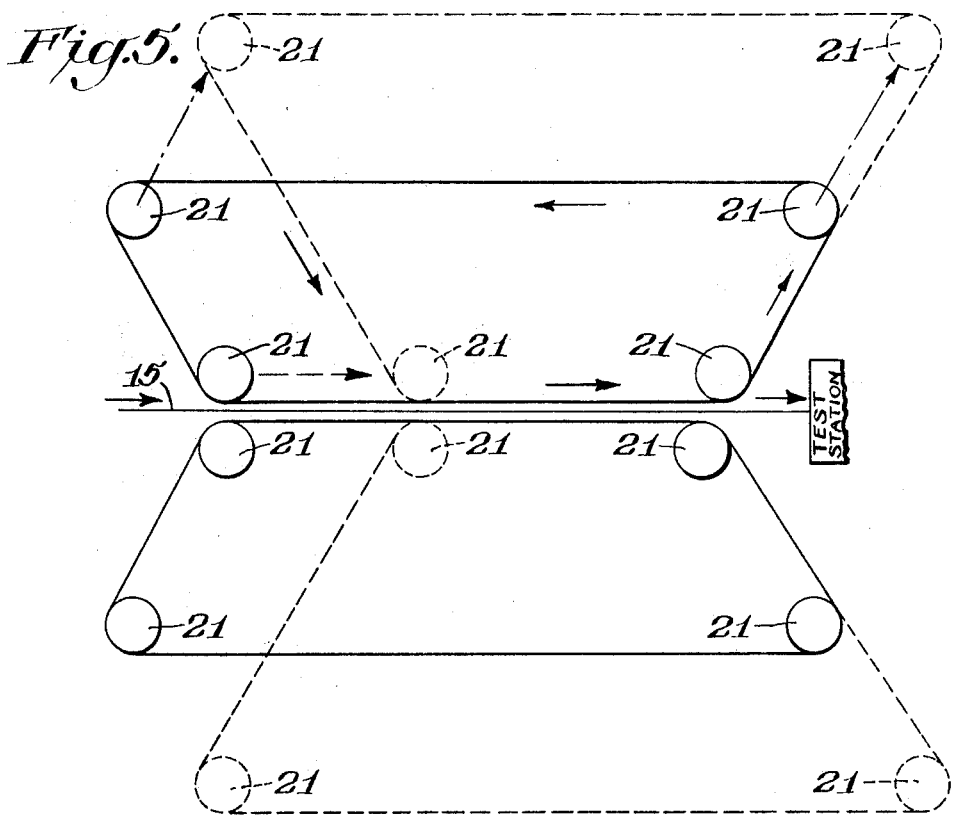
INVENTORS
Richard C. Peterson
John M. Seacord
BY Connolly and Hutz
ATTORNEYS United States Patent Office 3,273,057
Patented Sept. 13, 1966

3,273,057
APPARATUS FOR CONTINUOUS VOLTAGE APPLICATION IN TESTING
Richard C. Peterson, North Adams, and John M. Seacord, Williamstown, Mass., assignors to Sprague Electric Company, North Adams, Mass., a corporation of Massachusetts
Filed Dec. 31, 1963, Ser. No. 334,854
3 Claims. (Cl. 324—60)

The present invention relates to a testing apparatus for continuously and automatically testing complete electrical capacitors. In particular, the invention relates to apparatus for applying potential to the terminals of small completed capacitors which are commonly and extensively used in a great variety of electrical devices.

An electrical capacitor for use in an electrical device has certain electrical characteristics or properties which vary from unit to unit. The proper use of electrical capacitors in the devices requires the matching of the electrical characteristics and properties of the capacitor unit to the requirements of the electrical device. Therefore, during the manufacture of the electrical capacitor certain characteristics are produced within the capacitor so that the capacitor will be able to match the needs of a device requiring the produced characteristics.

The manufacturer produces these characteristics by specific steps in the process of manufacture. Among the characteristics thus produced are the capacitance, the insulation resistance, the lack of leakage current and the lack of dissipation loss or the dissipation or power factor. Also the units are supplied to operate at various voltage readings. A useful capacitor desirably has certain values for the important characteristics. In the case of leakage current and dissipation factor, these values are as minimal as possible. Therefore, at the completion of the manufacturing process, it is necessary to establish the existence and value of these characteristics in the produced capacitor. This establishment of the characteristics is generally achieved by electrical tests of the produced unit. In the production of some types of capacitors, every unit is tested for all desired characteristics, and this is known as a 100% check.

In the past the capacitor manufacturer has found it necessary to choose between making tests of each individual unit at a stationary position in a batch type operation or to encounter certain difficulties or shortcomings in trying to conduct these tests in a continuous or moving type of operation. One such test is the application of a potential to a finished unit for the purpose of making certain electrical tests on the charged unit. In the testing of many capacitors where an extremely accurate determination is necessary, it has been essential to apply the potential in a stationary or batch type operation so that a uniform application of electrical potential can be achieved.

The capacitors must be first provided with an electrical charge by the application of an electrical potential and this potential must be as uniform as possible. In certain capacitors, particularly very small capacitors with thin wire leads, attempts to apply an electrical potential in a continuous or moving operation have produced irregularities or unevenness in the application of potential and in the resultant charge. This in turn deprives the manufacturer of a uniformity of electrical charge among a group of tested capacitor units. This lack of uniformity in turn makes difficult or impossible the accurate identification and evaluation of the electrical characteristics of the capacitor units. Heretofore, the manufacturer has not been able to provide a satisfactory test or electrical characteristics in a procedure whereby the electrical charge is applied to the tested unit during a continuous or moving operation. At the same time, it is important that the charge be applied in a continuous operation as the time period of the application of the charge consumes the greatest part of the time for testing the unit. When capacitor production involves a 100% check this is a particularly important consideration.

Also, it is desirable to easily feed the units into the apparatus for continuous voltage application and to eliminate the trouble and expense of adding the units into a stationary position for applying the potential as well as using the space for holding a number of units during a batch type operation.

It is an object of the present invention to provide a new and improved testing apparatus which automatically applies an electrical potential to the leads of an electrical capacitor in a continuous process.

A further object of the invention is to provide a testing apparatus of the above object wherein the capacitor units are rapidly processed through the potential applying apparatus.

Still another object of this invention is to provide a testing apparatus wherein the capacitor leads are attached to the electrical potential through low resistance contacts.

Another object of this invention is to provide a testing apparatus wherein a supply of finished capacitors is continuously fed to an electrical potential applying station.

Among other objects a further object of the invention is to provide an electrical potential applying apparatus for providing capacitor units which leave the potential applying units under a uniform electrical potential.

These and other objects of this invention will become more apparent upon a study of the following description taken together with the accompanying drawings in which:

FIGURE 3 is an enlarged section of a portion of the apparatus taken on line 3—3 of FIGURE 1 in the direction of the arrows showing detail;

FIGURE 5 is a schematic side view of a modification of the apparatus.

Briefly, the apparatus comprises belts for continuous voltage application to capacitor units which are fed by a conveyor means. Each belt is made up of a number of separate low-resistance contacts which are adapted to individually engage the terminal leads of a capacitor for testing. There are four endless belts, basically the same, each driven by suitable drive means so as to cause the contacts to revolve in a predetermined path. The belts move around parallel axes and are divided into two pairs. The travel of the contacts brings contacts of the paired belts into opposition during a substantial part of the travel. Thus, the apparatus operates to bring successive contacts in close juxtaposition, if not into contact. The apparatus is arranged and the drive of the belts is adjusted so as to move the contacts of all the belts at the same rate of movement, which rate of movement in turn is synchronized to the rate of movement of the capacitor conveyor means.

The capacitors are fed into the belts and brought into a firm and low resistance engagement with the low resistance contacts. The capacitors move through the apparatus together with the contacts at the common rate. Both of the belts on one side are connected to a voltage source. One of the belts on the opposite side is suitably connected to ground. In its passage through the apparatus the capacitor becomes charged under the voltage which is determined by the potential applied, the resistance 33 to ground and the low resistance contact to the capacitor. After passing through the apparatus, the capacitor is advanced to test stations where the electrical characteristics of the capacitor are suitably tested.

Figure 1:
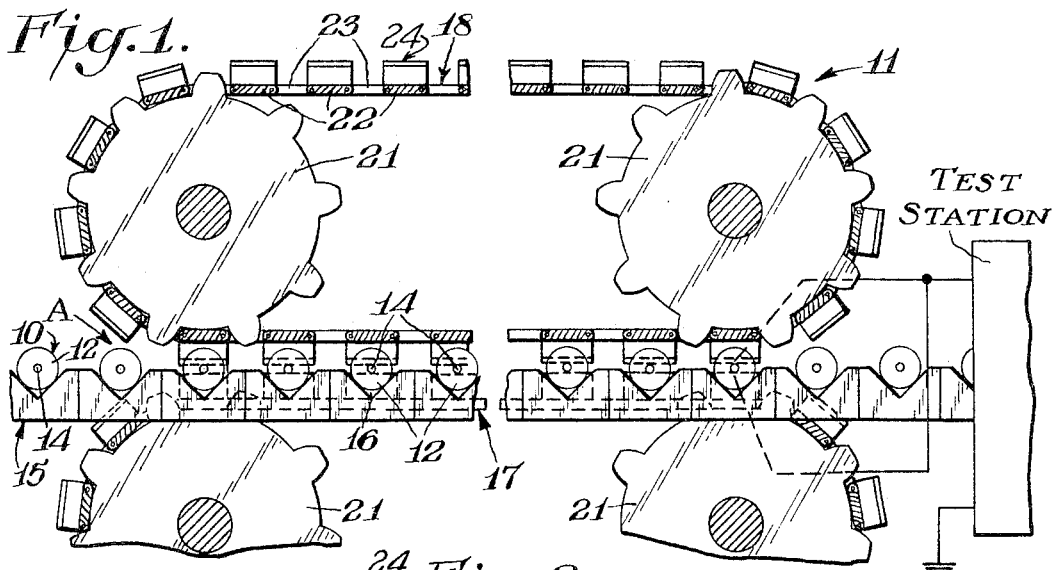
FIGURE 1 is a longitudinal section partly in elevation of an embodiment of the apparatus of this invention.
Figure 2:
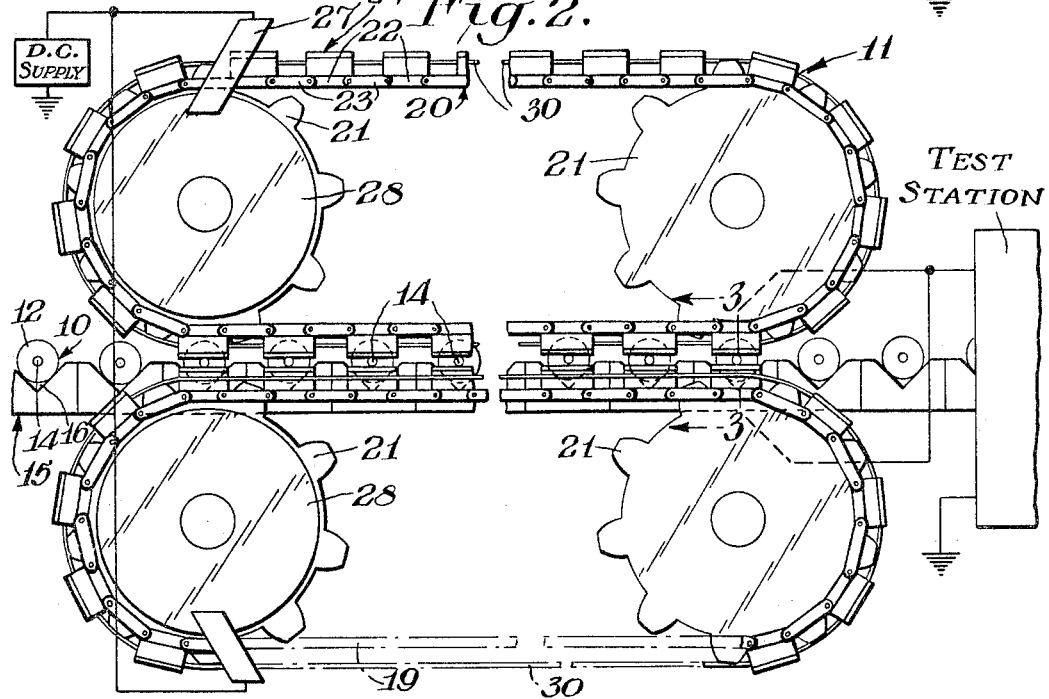
FIGURE 2 is a side view of the apparatus.

Referring now in particular to the figures, capacitors 10 are shown in FIGURES 1, 2 and 3 passing through an apparatus 11. The capacitors as illustrated have cylindrical bodies 12 and axially extending leads 13 and 14. The capacitors are conveyed through the apparatus 11 on a conveyor mechanism 15.

The convey mechanism as shown in FIGURE 1 has a number of recesses 16, each one of which receives a capacitor body 12. Thus supporting the capacitor 12, the conveyor mechanism 15 moves the capacitors 10 into the apparatus 11. The apparatus 11 in turn is made up of four belts 17, 18, 19 and 20 driven by suitable drive means 21. Belts 17 and 18 are illustrated in FIGURE 1 and belts 19 and 20 are illustrated in FIGURE 2.

Referring to FIGURE 1, belt 17 is the lower belt and belt 18 is the upper belt. These belts 17 and 18 are paired on one side of the conveyor mechanism 15. Referring to FIGURE 2, belt 19 is the lower belt and belt 20 is the upper belt. Belts 19 and 20 are paired on the opposite side of the conveyor mechanism 15 from the belts 17 and 18. Referring to FIGURE 3, the arrangement of the belts 17, 18, 19 and 20 with respect to the conveyor mechanism 15 is illustrated. Belts 19 and 20 are paired to the right of the conveyor mechanism 15 as illustrated in FIGURE 3 while belts 17 and 18 are paired to the left of conveyor mechanism 15.

Referring again to FIGURE 1, the direction of movement of the belts 17 and 18 is illustrated by the arrows. Each of the belts 17–20 in the illustrated embodiment are made up of a number of segments 22 attached together by links 23. Each of the segments 22 carry an individual member 24. The members 24 are made up of an insulator 25 and a conductor 26. The arrangement of the members 24 on the respective segments 22 is such as to make each member 24 separate and individual, and thus the belts are articulated. As the belts 17 to 20 are identical in their articulated construction, the members 24 match each other when positioned to each other during the coincident portions of the path of travel of the members as described above. The coincident path of movement in the apparatus illustrated in FIGURES 1 and 2 is indicated by the arrow A. As indicated by the arrows of motion, belt 17 moving in a clockwise direction around the drive means 21 passes its members 24 upward from below into the coincident portion of the path of travel. Similarly, the belt 18 moving in a counter-clockwise direction as shown in FIGURE 1 moves its members 24 downward into the coincident portion of the travel path.

The conveyor mechanism 15 on the other hand is passed along the coincident portion of the path of travel in its traverse of the apparatus 11. Thus, as illustrated in FIGURE 1 the members 24 of the belts 17 and 18, the conveyor mechanism 15 and the capacitors 10 on the conveyor mechanism 15 are all juxtaposed in their traverse of the apparatus 11 along the coincident portion of the path of member travel.

Referring to FIGURE 2, the movement of the belts 19 and 20 are similar to the movement of the belts 17 and 18 with belt 19 corresponding to belt 17 and belt 20 corresponding to belt 18.

As can be seen by the arrangement of the respective members 24 and capacitors 10 in FIGURES 1 and 2, each capacitor 10 is accompanied by a member 24 on each of the belts 17–20. FIGURE 3 illustrates the resultant arrangement of the parts during the travel along the above-mentioned coincident portion. As seen in FIGURE 3, the member 24 of belt 18 is shown in the upper left side of the figure while the members 24 for the other belts 17–19 are positioned around the capacitor body 12 in accordance with the above-noted description. Lead 13 extends to the left of the body 12 while lead 14 extends to the right. Accordingly lead 13 is positioned between and in electrical contact with the members 24 of belts 17 and 18 while the lead 14 is positioned between and in electrical contact with the members 24 of the belts 19 and 20. The capacitor body 12 supported in the recess 16 of the V-block construction of the conveyor mechanism 15 lies with its axis normal to the path of travel so that the axially extending leads 13 and 14 stick out to the sides of the conveyor mechanism 15 as the conveyor mechanism moves in its travel through the apparatus 11.

As illustrated in FIGURE 3, each of the members 24 mounted on its respective segment 22 has the insulator 25 which in the illustrated embodiment is made up of a rigid insulator, such as a phenolic resin on which is mounted a resilient insulator such as rubber. The conductor 26 on this insulator portion 25 may be made up of a conductive metal 29 having a thin plate 29A on its surface such as gold plated copper. Thus there is for each of the members 24 on the belts 17–20, a conductive material making up conductor 26 mounted on its insulator 25 in contact with one of the capacitor leads 13 and 14.

It will be seen that an electrical charge or current applied to one of the members 24 will be applied through the capacitor to the contacts on the other side of the conveyor mechanism 15. Moreover, as long as the voltage is applied to one of the contacts 24 gripping a capacitor 10, that unit will be under potential.

It is a feature of this invention that this electrical contact is made with the leads of the capacitor 10 and maintained with the leads 13 and 14 through the capacitor throughout the travel of the conveyor mechanism 15 through the apparatus 11 without any relative motion between the contacting parts. Further it is a low electrical resistance contact. Moreover, it is another feature that the resilience of the insulator mounting maintains a secure grip of the members 24 on the respective leads 13 and 14. This grip is produced by the approach of the matching members 24 on the paired upper and lower belts, 17 and 18, 19 and 20. As indicated in FIGURE 3, the respective members are brought together so as to electrically contact the leads 13 and 14. The contact has a low electrical resistance because of the good grip and the nature of the material making the contact.

A charge is applied to the capacitors 10 from a suitable source. This is a continuous voltage application. In the embodiment illustrated in the figures, the electrical charge is applied through the belts 17 and 18 and more particularly, through a brush 27 and a slip ring 28 which are in electrical contact therewith. The brush 27 is connected to a D.C. supply and contacts the slip ring 28 which is mounted on one of the drive means for the belts 17 and 18. The metal drive means 21 is in electrical contact with the metal segments 22 of the belts 17 and 18.

Figure 4:
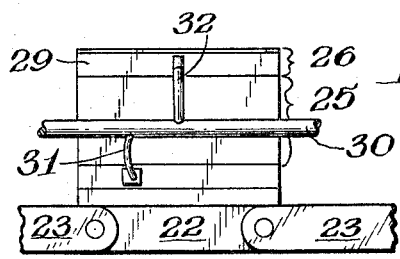
FIGURE 4 is a side view of a part of the positive belt of the apparatus.

Referring to FIGURE 4, the arrangement for assuring low resistance distribution of the electricity from this source is illustrated. Each member 24 includes a conductor 26. As described above, the insulator 25 is made up of a rigid insulator part and a resilient insulator part. On this insulator 25 is mounted the conductor 26 which in this embodiment is described as gold plated copper. The individual members are electrically separated from each other. In the belts 17 and 18 it is essential that the continuous voltage application reach all of the members 24 equally and through low resistance during the period when the members 24 pass along their coincident portion of the travel. One means of providing this is illustrated in FIGURES 2 and 4. Referring to FIGURE 4, common wires extend alongside belts 17 and 18. These common wires 30 have connections 31 attaching them to conductors 26 and other connections 32 connecting them to the conductors 26. This same arrangement is provided for each of the members 24 of the belts 17 and 18. In FIGURE 2 the common wire 30 can be seen through the spaces between the members 24.

The rate of movement of the capacitors 10 in traversing the coincident portion of travel may be adjusted to apply a suitable electrical charge to the capacitor unit. Upon leaving the apparatus 11 the capacitors 10 thus carry the desired electrical charge. This electrical charge is uniform among the successive capacitors and has been applied under a relatively low resistance.

The charged capacitors 10 still supported on the conveying mechanism 15 are moved into the test station where suitable electrical tests are practiced on the charged unit. Among these tests are tests in which the leakage current of the capacitor unit is involved. In such tests involving the capacitor leakage current, as well as other tests, the low resistance under which the electrical charge is applied is an advantage of this invention. Further, in these tests the uniformity of the electrical charge among the successive units is an advantage.

Among other advantages this invention provides, in the rapid testing of capacitors, a low resistance contact on the capacitor terminals, during a continuous voltage application, which contact easily made and quickly released to facilitate rapid handling.

The above described apparatus and method are illustrative of the invention. Additions and modifications may be made. For example, FIGURE 5 illustrates a modification for varying the period of time of voltage application. The period for the travel of the capacitors through the apparatus 11 may be varied by moving the drive means 21 from the position shown in solid lines to the position shown in dotted lines in FIGURE 5. Accordingly, the period of travel of conveyor 15 is shortened. Conversely it can be lengthened by moving the drive means in the opposite direction. This change of period can be accomplished without varying the rate of belt movement.

Obviously, many modifications and variations of the present invention are possible in the light of the above teachings. It is, therefore, to be understood that within the scope of the appended claims, the invention may be practiced otherwise than as specifically described.

What is claimed is:

1. A testing apparatus for testing electrical capacitors such as capacitors containing electrical resistance and having thin, delicate lead wires including two pairs of movable endless conveyors, a series of resilient contacts mounted on each of said endless conveyors, a conductive layer in each of said contacts mounted on a resilient insulator backing, a noble metal surface on each of said conductive layers whereby said resilient contacts have low electrical resistance in relation to the electrical resistance of said capacitors, said parallel endless conveyors being arranged in pairs so that the contacts of said paired conveyors move in juxtaposition with each other during a part of the travel of said conveyors, means for moving said capacitors in contact with said moving contacts for a period of time and travel, said paired endless conveyors being disposed so that said respective paired sets of contacts are arranged axially of said moving capacitors, whereby said thin delicate lead wires are contacted between said juxtaposed paired contacts during said period of time and travel, means for continuously applying a voltage to said contacts connected to said capacitors, so constructed and arranged as to apply a uniform voltage charge to a succession of said capacitors and under said low resistance.

2. In a method of determining electrical characteristics of an indeterminate plurality of capacitors having axially extending leads, the steps of grasping one lead of a capacitor having axially extending leads between a first pair of moving resilient contacts having a low electrical resistance in relation to the electrical resistance of said capacitor, grasping the other lead of the capacitor between a second pair of moving resilient contacts, moving the capacitors progressively along a line of travel with said leads extending normal to the direction of travel, moving said first and second pairs of grasping contacts in contact with the respective leads along with and in the same direction of travel as said capacitors, applying an electrical potential between the first and the second pairs of contacts, and moving said capacitor and respective grasping contacts together under said applied electrical charge without interruption of application of said electrical charge to fully charge said capacitor with said potential, and subsequently testing the electrical characteristics of said capacitor without interruption of application of said electrical charge.

3. A testing apparatus for testing electrical capacitors such as capacitors containing electrical resistance and having thin, delicate lead wires including two pairs of cooperating movable endless conveyors, a series of resilient contacts mounted on each of said endless conveyors, a conductive layer in each of said contacts mounted on a resilient insulator backing, a low electrical resistance surface on each of said conductive layers whereby said resilient contacts have low electrical resistance in relation to the electrical resistance of said capacitors, said endless conveyors being arranged in pairs so that the contacts of said paired conveyors move in juxtaposition with each other during a part of the travel of said conveyors, means for moving said capacitors in contact with said moving contacts for a period of time and travel, said paired endless conveyors being disposed so that said repective paired sets of contacts are arranged axially of said moving capacitors, whereby said thin delicate lead wires are contacted between said juxtaposed paired contacts during said period of time and travel, means for continuously applying a voltage to said contacts connected to said capacitors, so constructed and arranged as to apply a uniform voltage charge to a succession of said capacitors and under said low resistance.

References Cited by the Examiner

UNITED STATES PATENTS

| 2,362,691 | 11/1944 | Gaiser | 324—60 X |
| 2,476,886 | 7/1949 | Miller et al. | 339—278 X |
| 2,736,862 | 2/1956 | Tooker | 324—60 X |
| 3,073,446 | 1/1963 | Wilson et al. | 324—62 X |

FOREIGN PATENTS 545,916    9/1957    Canada.

WALTER L. CARLSON, *Primary Examiner.*

E. KUBASIEWICZ, *Assistant Examiner.*